: # 3,317,085
FEEDERS FOR GRANULAR OR PULVERULENT MATERIALS
Ernest William Higgs, Chinley, England, assignor to Henry Simon Limited, Stockport, England
Filed Oct. 18, 1965, Ser. No. 497,400
Claims priority, application Great Britain, Oct. 21, 1964, 42,874/64
5 Claims. (Cl. 222—58)

This invention relates to feeding means for apparatus wherein a flowing stream of granular or pulverulent material is subjected to a continuous process, and is particularly directed to such feeding means wherein the stream of materials is formed into a moving relatively thin curtain of uniform density extending over the full width of the processing means.

Generally a feeding means for the purpose described comprises a hopper of a width not less than that of the required material curtain the hopper having an outlet port near or at its base extending over the full width of the required material curtain, and an adjustable feed-gate arranged to operate as a closure for the hopper outlet port but capable of being set to provide an outlet opening of such area as will allow of the outward flow of a material curtain of a required thickness. The hopper may incorporate positively driven material impelling means arranged to direct a flow of material towards and through the outlet opening, and may also incorporate positively driven lateral spreading means arranged to spread material substantially evenly over the full width of the hopper.

Where the rate of flow of material into such a hopper can vary, it is desirable and usual to provide self-adjusting feed-gate control means whereby the feed-gate is automatically moved to a position where the rate of flow from the hopper outlet is substantially equal to the rate of flow of material into the hopper. Similarly, where it is necessary or desirable to render a processing plant inoperative when the quantity of material available for feeding is insufficient to allow of the proper performance of a required process it is usual that the means which controls the position of the feed-gate is also arranged to activate control means which regulate the operation of the processing plant.

Such self-adjusting feed-gate control means usually take the form of balanced linkages which are moved by members that respond to changes in the level of the material contained within the hopper or to changes in the drag forces generated by material entering the hopper, but it is a disadvantage of known mechanical means employing the former of these alternatives that the apparatus tends to be insensitive and sluggish in operation; and it is a disadvantage of known mechanical linkage means employing the latter alternative that in conditions where quantatively large flow-rate changes occur frequently the apparatus tends to become unstable so that "hunting" occurs causing unreliable control. It is a further disadvantage that where balanced mechanical linkage arrangements are employed for the automatic control of apparatus for the feeding of powdery materials the relatively moving parts of the linkages tend to become fouled by airborne powder in such a way that their efficient operation may be impaired.

The object of the present invention is to provide improved feeding means having automatic feed-gate control mechanism which is free from these disadvantages.

According to the invention, a feeding means for granular or pulverulent material, comprising a hopper having at the bottom of one of its walls an outlet port which is vertically narrow relative to its horizontal width and whereof the effective outlet area is controlled by a pivoted feed-gate biased towards a closed position and arranged so that the port-closing part of the feed-gate remains parallel to the bottom of the outlet port as the feed-gate is caused to rock on its pivots to vary the height of the outlet port opening, and means which regulates the pivotal movements of the feed-gate in accordance with the deadweight of the material supported by at least a portion of the base of the hopper which regulating means is a collapsible reservoir containing air and being so mounted relative to the base of the hopper that a resilient cushion is formed to support the weight of the material superimposed thereon, and a connecting pipe leading from the collapsible reservoir to a secondary collapsible reservoir mounted between a fixed structural element and a lever extension of the pivoted feed-gate, the two collapsible reservoirs and their connecting pipe being sealed against any loss of their contents so that air displaced from the hopper base collapsible reservoir by the weight of the material supported thereon flows through the connecting pipe to the secondary collapsible reservoir causing it to expand and move the lever extension of the feed-gate so that the feed-gate is caused to rock on its pivots to a position providing a feed outlet area directly related to the weight of material supported by the hopper base reservoir, characterised in that the connecting pipe between the collapsible reservoirs has a branch connecting pipe leading to a sealed pressure chamber of a pressure sensitive device of known kind arranged to actuate members which control the operation of the processing machinery associated with the feeder in such manner that when the weight of material resting on the reservoir in the hopper falls below a predetermined value the feed-gate is closed and simultaneously the machinery is rendered inoperative.

The hopper base collapsible reservoir may be an elongated flattened balloon-like unit made from a rubber-like material which unit lies inside the hopper to cover a portion of the base thereof so as to form a resilient cushion which tends to be flattened by the weight of the material supported thereby, or alternatively the hopper base collapsible reservoir may be in the form of a thin-walled corrugated metallic tubular bellows which supports a hingeable portion of the hopper base in such a manner that the weight of the material resting on the said hingeable portion causes the metallic tubular bellows to be deformed longitudinally. Similarly the secondary collapsible reservoir which actuates the feed-gate may either be a balloon-like unit made from rubber-like material, or a metallic bellows made from corrugated tubing.

The connecting pipe between the collapsible reservoirs has a branch pipe leading to a sealed pressure chamber of a pressure sensitive device of known kind arranged to actuate members which control the operation of the processing machinery associated with the feeder in such manner that the machinery is rendered inoperative when the weight of material resting on the reservoir in the hopper falls below a predetermined value.

The pressure of the air in the reservoir system is so adjusted in relation to the biasing force tending to move the feed-gate to the closed position and to the triggering pressure of the pressure-sensitive device, that the processing machinery indirectly controlled by the device will be inoperative and the feed-gate will be retained in the closed position until a predetermined weight of material rests on the reservoir in the hopper; thereafter any further quantity of material entering the hopper will cause the pressure-sensitive device to actuate the controls which bring the processing machinery into operation and will cause the feed-gate to be moved to such positions as will provide that the rate of flow of material passing as a relatively wide curtain of uniform thickness and density through the hopper outlet opening is substantially equal to the average rate of flow of material entering the hopper.

Embodiments of the present invention will now be described, by way of example, with reference to the accompanying drawings, in which.

Figure 1:
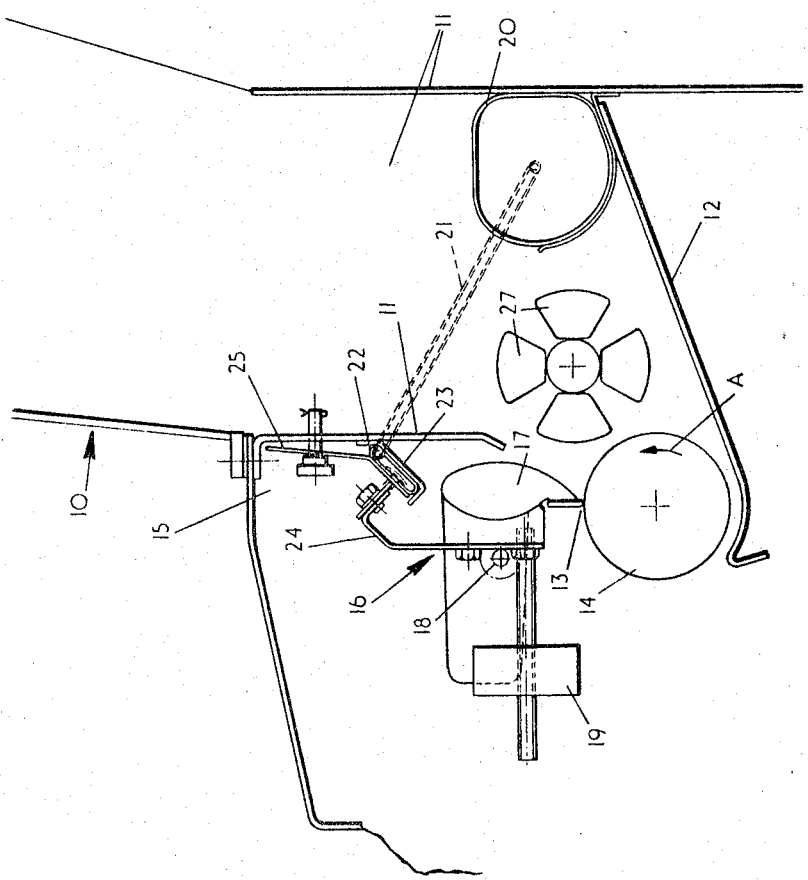
FIG. 1 is a diagrammatic side view of a feeding means according to the present invention.
Figure 2:
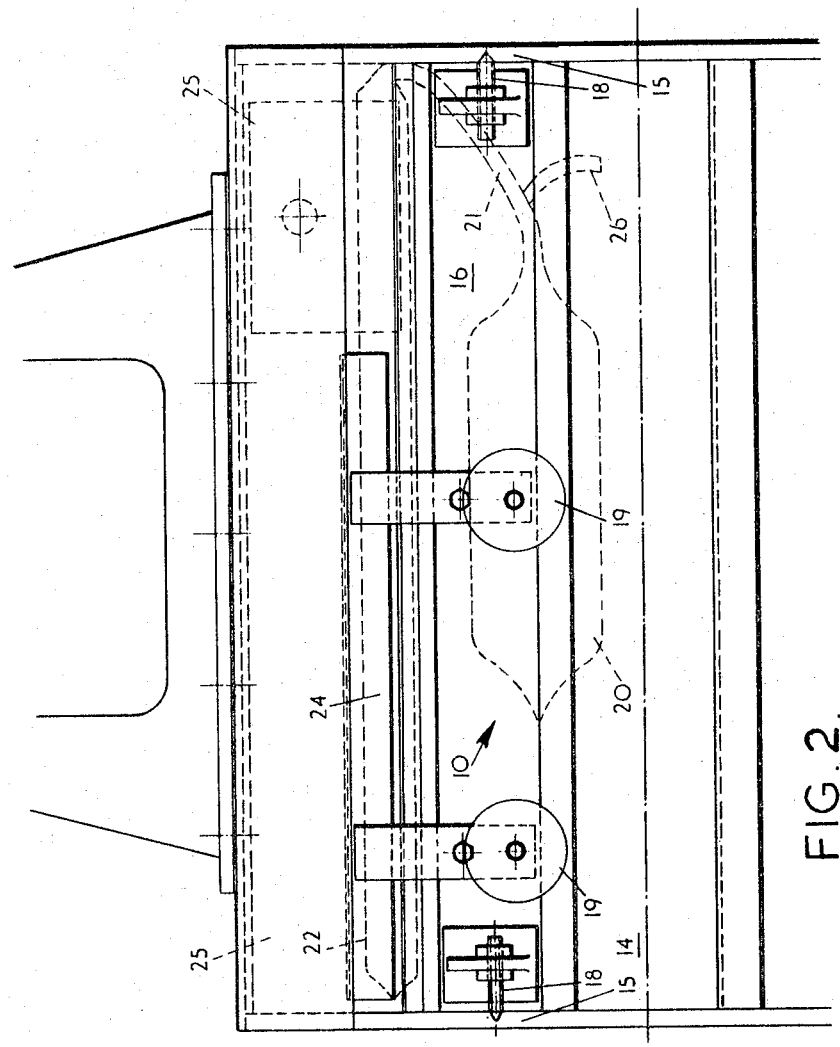
FIG. 2 is a front view corresponding to FIG. 1.

Referring to FIGS. 1 and 2 of the drawings, the feeding means comprises a hopper 10 of comparatively low height comprising four substantially vertical boundary walls 11 and a bottom closure plate 12 and having a horizontal cross-sectional shape in the form of a rectangle of which the width is much greater than the length has, between the bottom edge of the front wall 11, and the upper surface of the bottom closure plate 12, an outlet opening 13 which is vertically narrow but which extends over substantially the full width of the hopper 10. Mounted so as to lie within the lower part of the said opening 13 for which it forms a part closure member, is a rotatable feed roller 14 which is axially parallel with the front wall 11 of the hopper 13 and with the bottom closure plate 12, which feed roller 14 is caused to rotate in that direction (see arrow A) which will impel material from the hopper 10 towards the gap between the upper part of the roller surface and the top edge of the opening 13 in the front wall 11.

Supported outside the hopper 10 from extensions 15 of the side walls 11 thereof, is a pivoted feed-gate 16 having a feed-controlling gate portion 17 with a surface that is in the form of a narrow section of a cylinder which is axially parallel with the feed roller 14. The pivot axis 18 of the feed-gate 16 is so positioned that the cylindrically-faced gate portion 17 of the feed-gate 16 lies immediately outside the gap above the feed roller 14 and extends over the full width of the hopper 10, the bottom of the said gate portion 17 being parallel to the surface of the feed roller 14 on which surface it sits when the feed-gate 16 is pivoted to its closed position. The cylindrically-faced gate portion 17 of the feed-gate 16 is counterbalanced by weight members 19 so that there is a relatively small weight-bias tending to cause the feed-gate 16 to pivot the closed position.

Mounted so as to lie along a portion of the base of the hopper interior is an air-filled elongated rubber-like balloon 20 which communicates with a flexible pipe 21 leading to a similar but cross-sectionally smaller balloon 22 which is mounted on a supporting rail 23 on the outside of the front wall 11 of the hopper 10 so that it is above substantially the whole length of the feed-gate 16 and parallel to its axis 18. A lever extension 24 of the feed-gate 16 rests on the surface of the balloon 22 in such a way that expansion of the balloon 22 causes the feed-gate 16 to rock on its pivots 18 and alter the height of the feed outlet opening 13. Part of the surface of the feed-gate operating balloon 22 supports a hinged pressure-plate 25 the position of which can be adjusted to vary the pressure of the air within the confines of the two balloons 20, 22 and their communicating pipe 21. A branch 26 of the communicating pipe 21, leads to the sealed chamber of a pressure-sensitive device of known kind (not shown) arranged to actuate means which control the operation of machinery associated with the feeding means.

A rotatable spreader 27 is disposed within the hopper 10 adjacent the bottom 12.

In operation, an increase in the weight of material above the balloon 20 in the hopper 10 causes displacement of air therefrom which displaced air flows through the communicating pipe 21 to the feed-gate operating balloon 22 causing it to expand and move the feed-gate lever 24, a change in pressure in the pipe 21 also being communicated to any pressure-sensitive device associated therewith via the branch pipe 26.

Figure 3:
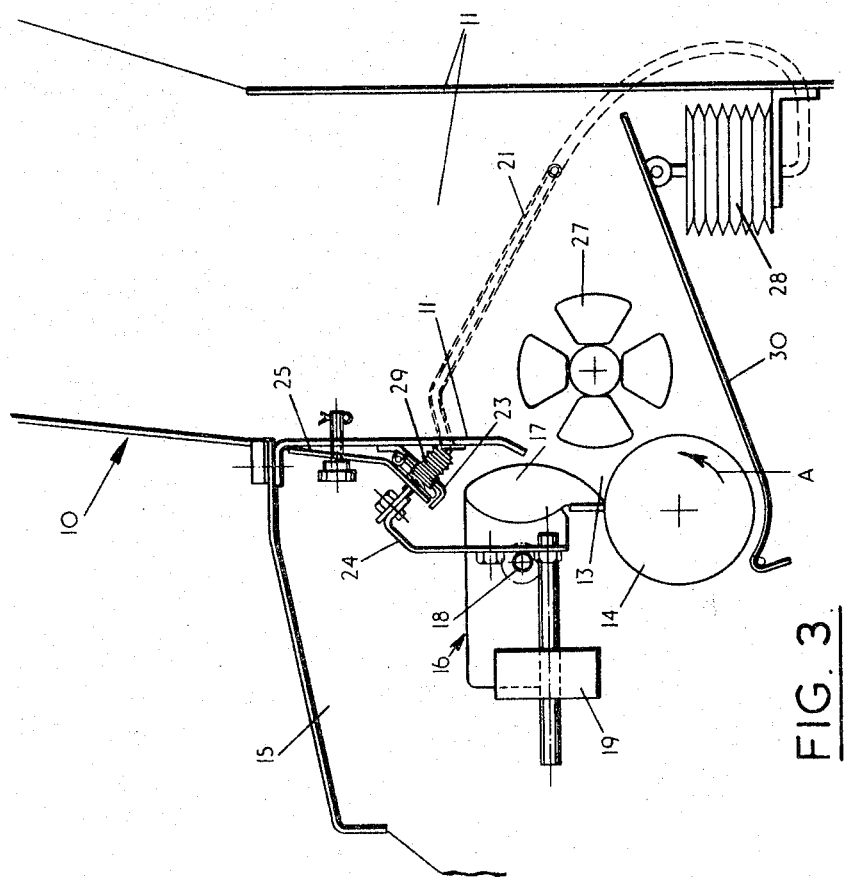
FIG. 3 is a diagrammatic side view of a modified feeding means.

Referring now to FIG. 3 of the drawings, like parts are referred to by the same reference numerals, and in this embodiment, the elongated rubber-like balloons 20 and 22 are replaced by interconnected longitudinally collapsible corrugated metallic tubular bellows units 28 and 29, the bellows 28 supporting a hinged portion 30 of the hopper base in such manner that the weight of material resting on the hinged portion 29 motivates the arrangement in an equivalent manner to the embodiment described with reference to FIGS. 1 and 2.

What is claimed is:

1. A feeding means for granular or pulverulent material, comprising, a hopper having at the bottom of one of its walls an outlet port which is vertically narrow relative to its horizontal width and whereof the effective outlet area is controlled by a pivoted feed-gate biased towards a closed position and arranged so that the port-closing part of the feed-gate remains parallel to the bottom of the outlet port as the feed-gate is caused to rock on its pivots to vary the height of the outlet port opening, means which regulates the pivotal movements of the feed-gate in accordance with the dead-weight of the material supported by at least a portion of the base of the hopper which regulating means is a collapsible reservoir containing air and being so mounted relative to the base of the hopper that a resilient cushion is formed to support the weight of the material superimposed thereon, and a connecting pipe leading from the collapsible reservoir to a secondary collapsible reservoir mounted between a fixed structural element and a lever extension of the pivoted feed-gate, the two collapsible reservoirs and their connecting pipe being sealed against any loss of their contents so that air displaced from the hopper base collapsible reservoir by the weight of the material supported thereon flows through the connecting pipe to the secondary collapsible reservoir causing it to expand and move the lever extension of the feed-gate so that the feed-gate is caused to rock on its pivots to a position providing a feed outlet area directly related to the weight of material supported by the hopper base reservoir, characterised in that the connecting pipe between the collapsible reservoirs has a branch connecting pipe leading to a sealed pressure chamber of a pressure sensitive device of known kind arranged to actuate members which control the operation of the processing machinery associated with the feeder in such manner that when the weight of material resting on the reservoir in the hopper falls below a predetermined value the feed-gate is closed and simultaneously the machinery is rendered inoperative.

2. A feeding means for granular or pulverulent material as claimed in claim 1, in which the hopper base collapsible reservoir is an elongated flattened balloon-like unit made from a rubber-like material which unit lies inside the hopper to cover a portion of the base thereof so as to form a resilient cushion which tends to be flattened by the weight of the material supported thereby.

3. A feeding means for granular or pulverulent material as claimed in claim 2, in which the secondary collapsible reservoir which actuates the feed element is a balloon-like unit made from rubber-like material.

4. A feeding means for granular or pulverulent material as claimed in claim 1, in which the hopper base collapsible reservoir is in the form of a thin-walled corrugated metallic tubular bellows which supports a hingeable portion of the hopper base in such a manner that the weight of the material resting on the said hingeable portion causes the metallic tubular bellows to be deformed longitudinally.

5. A feeding means for granular or pulverulent material as claimed in claim 4, in which the secondary collapsible reservoir which actuates the feed element is a metallic bellows made from corrugated tubing.

References Cited by the Examiner

UNITED STATES PATENTS

| | | | |
|---|---|---|---|
| 247,215 | 9/1881 | Sage | 222—58 |
| 333,834 | 1/1886 | Corliss | 60—54.5 |
| 1,446,439 | 2/1923 | Liberman | 60—54.5 |

ROBERT B. REEVES, *Primary Examiner.*

HADD S. LANE, *Examiner.*